April 18, 1961
D. A. POTEET
2,980,464
FISHING TOOL
Filed March 3, 1960
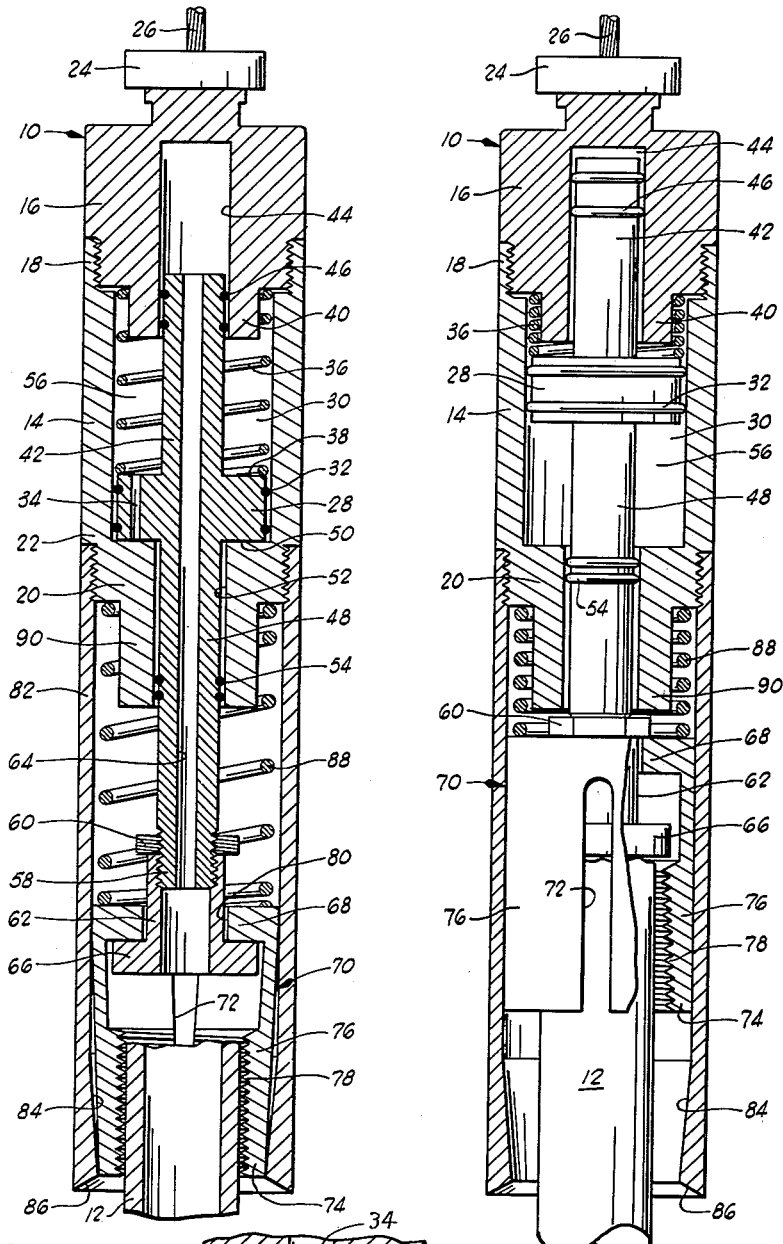
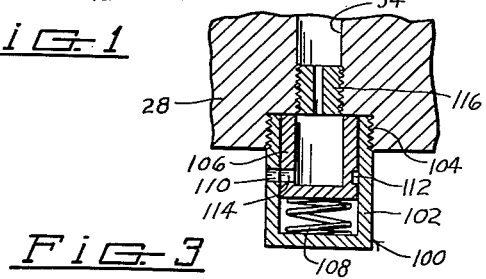
INVENTOR.
DALLAS A. POTEET
BY
*Jerry J Dunlap*
ATTORNEY

2,980,464

FISHING TOOL

Dallas A. Poteet, Diamond-D-Ranch, Milo, Okla.

Filed Mar. 3, 1960, Ser. No. 12,564

12 Claims. (Cl. 294—86)

This invention relates to improvements in tools used for recovering articles such as pipes, rods or tools stuck or lost in a well bore, mine shaft or the like.

As it is well known in the oil industry, various articles, such as strings of drill pipe, tubing and sucker rods, frequently part at an intermediate portion thereof in a completed or partially completed well bore, such that the upper end of the portion of the article lost or remaining in the well bore is positioned in an intermediate portion of the well bore. In order to recover the portion of the article remaining in the well bore, a grappling device is lowered through the well bore into engagement with the upper end of the article. The grappling device is commonly known in the art as a "fishing" tool and the lost article is commonly known in the art as a "fish."

Various types of fishing tools have been devised, and several designs are presently on the market which will efficiently locate the upper end of the fish and become coupled to the fish. However, the fish is frequently wedged in the well bore to such a degree that it cannot be removed by simply pulling up on the fishing tool. Therefore, it is highly desirable that provision be made for releasing the fishing tool from the fish.

Substantially all fishing tools used in the oil industry are provided with a slips mechanism which is either telescoped around the upper end of the fish, or, when the fish is in the form of a tubular article, such as drill pipe, the slips mechanism may be designed to engage the inner surface of the fish. Most prior fishing tools require a rotation of the fishing tool in order to release the slips mechanism from a stuck fish. Therefore, the fishing tool must be supported on a rod or tubing string which requires a substantial investment for a fishing operation and requires an unduly large length of time to lower or raise such a fishing tool through a well bore. Other prior fishing tools have required the use of fluid under pressure in the fishing tool for releasing the slips mechanism from a stuck fish, which in turn requires either the use of a tubing string for supporting the fishing tool or the use of one or more hoses extending downwardly through the well bore into connection with the fishing tool. Still other prior fishing tools have the slips mechanism supported therein by a shear pin or the like. In this last-mentioned type of fishing tool, the fishing tool may be supported on a wire line, but the fishing tool may be released from a stuck fish only by the dropping of a weight downwardly around the wire line to sever the shear pin and release the slips mechanism. Each of the above-mentioned types of fishing tools is either difficult to operate, or unduly expensive.

The present invention contemplates a novel fishing tool which may be lowered and raised through a well bore by use of a wire line and easily engaged with or disengaged from a fish without the use of any equipment or tools other than the fishing tool itself. In one embodiment, the slips mechanism of the fishing tool is urged downwardly into a fish-engaging position by a spring carried in the fishing tool, and means are provided to snub or suppress the action of the spring, such that the fishing tool may be easily disengaged from a stuck fish by first lowering the tool relative to the fish against the action of the spring, and then quickly raising the tool before the spring has an opportunity to re-engage the slips mechanism with the fish. In a preferred embodiment, the action of the spring is snubbed by means of a piston connected to the slips mechanism and reciprocally disposed in a closed chamber in the tool. Fluid is transferred between opposite ends of the chamber at a controlled rate, such that the piston and the slips mechanism can be moved only at a predetermined rate, which in turn allows the slips mechanism to be disengaged from the fish and the entire tool moved upwardly away from the fish before the spring can reengage the slips mechanism with the fish.

Broadly stated, the present invention may be defined as a fishing tool for recovering a fish in the form of a pipe or the like stuck in a well bore, comprising a tubular housing, means for lowering and raising the housing through the well bore, a piston reciprocally disposed in the housing for vertical movement in the housing, a spring carried by the housing urging the piston downwardly, means for controlling the downward speed of the piston, a slips actuating mechanism, a slips mechanism adapted to engage the fish when at the same level as the slips actuating mechanism and disengage from the fish when at a different level than the slips actuating mechanism, one of said mechanisms being carried by the housing and movable simultaneously with the housing, the other of said mechanisms being carried by the piston and shaped to contact the fish in a predetermined position of the housing relative to the fish for raising the piston relative to the housing upon downward movement of the housing from said predetermined position, whereby the slips mechanism may be engaged with and then disengaged from the fish by lowering and raising the housing at controlled speeds.

An important object of this invention is to provide a fishing tool which may be easily engaged with and disengaged from a stuck fish.

Another object of this invention is to provide a fishing tool which may be lowered and raised through a well bore or the like and easily engaged with and disengaged from a fish stuck in the well bore, without the use of any equipment or tools, other than the fishing tool itself.

A further object of this invention is to provide a fishing tool having a slips mechanism carried thereby which may be operated by merely raising and lowering the fishing tool at controlled speeds.

A more specific object of this invention is to provide a fishing tool having a slips mechanism urged downwardly by a spring, wherein the rate of expansion of the spring is controlled for engaging and disengaging the slips mechanism from a stuck fish.

Another object of this invention is to provide a fishing tool which may also be used as a wash-over tool when supported by a string of tubing or the like.

A still further object of this invention is to provide a fishing tool which is simple in construction, may be economically manufactured, will have a long service life and which may be simply and economically operated.

Other objects and advantages of the invention will be evident from the following detailed description, when read in conjunction with the accompanying drawings which illustrate my invention.

In the drawings:

Figure 1 is a vertical sectional view through a fishing tool constructed in accordance with this invention illustrating the position of the fishing tool when the tool is engaged with the upper end of a fish.

Figure 2 is another vertical sectional view of the tool shown in Fig. 1, with a portion of the slips mechanism shown in elevation and illustrating the operation of the tool as the tool is being released from a stuck fish.

Figure 3 is an enlarged detailed sectional view of a modified orifice construction.

Referring to the drawings in detail, and particularly Fig. 1, reference character 10 generally designates one form of my novel fishing tool which is utilized for engagement around the upper end of a fish 12 lost in a well bore or the like (not shown). The fish 12 may take any form, such as a portion of a string of drill pipe, tubing or sucker rods, as previously indicated.

The tool 10 comprises a tubular housing 14 having a head 16 threadedly secured in the upper end 18 thereof and having a head 20 formed or secured on the lower end 22 thereof. A suitable connector 24 is secured or formed on the upper head 16 for connection with a device 26 used for raising and lowering the tool 10 through a well bore. It will be understood that the connector 24 will be in the form of a socket when the device 26 is in the form of a wire line (as shown), and that the connector 24 will be in the form of a threaded member in the event the device 26 is in the form a string of tubing (not shown), as is common in the art.

A piston 28 is positioned in a chamber 30 formed in the main housing 14 between the heads 16 and 20. A pair of sealing rings 32, such as O-rings, are held in mating grooves around the periphery of the piston 28 to slidingly seal the piston in the chamber 30. Also, a restricted passageway or orifice 34 is formed through the piston 28, for purposes which will be hereinafter set forth. The piston 28 is urged downwardly toward the lower head 20 by a helical spring 36 anchored between the upper face 38 of the piston and the head 16. The upper end of the spring 36 extends around a tubular skirt or flange 40 formed on the lower end of the head 16 which secures the spring 36 concentrically in the chamber 30.

A cylindrical mandrel 42 is formed on the upper face 38 of the piston 28 and extends upwardly into a bore 44 formed at least partway through the upper head 16. Suitable sealing rings 46, such as O-rings, are held in mating grooves around the mandrel 42 in positions to slidingly seal the mandrel 42 in the bore 44, for purposes which will be described.

Another cylindrical mandrel 48 is formed on the lower face 50 of the piston 28 and extends downwardly through a mating bore 52 formed through the lower head 20. Also, a pair of sealing rings 54, such as O-rings, are held in mating grooves around the lower mandrel 48 in positions to slidingly seal the mandrel 48 in the bore 52. It will therefore be apparent that the chamber 30 is sealed at its upper and lower ends, such that a body of liquid 56, preferably oil, positioned in the chamber 30 will be required to flow through the restricted passageway 34 upon longitudinal movement of the piston 28. The liquid 56 will control the speed of movement of the piston 28, as will be described. It should also be observed that the outer diameters of the mandrels 42 and 48 are equal to provide uniform areas for the opposite end faces 38 and 50 of the piston 28, such that the displacement of the piston 28 will be equal during the opposite movements of the piston.

The lower mandrel 48 is of a length to protrude below the lower head 20 in any operating position of the piston 28, and the lower end 58 of the mandrel 48 is externally threaded to receive a nut 60 for purposes to be described. A tubular slip control member 62 is threadedly secured on the lower end 58 of the mandrel 48 below the nut 60 to effectively provide an extension of the mandrel 48 and a continuation of a passageway 64 formed through the mandrels 48 and 42 and the piston 28. It will be observed that the passageway 64 prevents the entrapment of fluid in the bore 44 of the head 16 upon reciprocation of the piston assembly. Also, this passageway 64 may be used for a washing liquid in the event a tool 10 is supported by means of a string of tubing (not shown) and when it is desired to use the tool 10 as a combination wash-over and fishing tool.

An outwardly extending flange 66 is formed on the lower end of the slip control member 62 to engage the upper end 68 of a slips mechanism generally designated by reference character 70 upon upward movement of the piston 28. The slips mechanism 70 is preferably in the form of a tubular member having a plurality of circumferentially spaced vertically extending slots 72 therein extending from adjacent the upper end 68 of the mechanism to the lower end 74 of the mechanism. The slots 72 form arms or fingers 76, and the slips mechanism 70 is preferably formed out of a metal such as spring steel, such that the fingers 76 tend to expand and depend vertically from the upper end 68, as will be described. Suitable serrations 78 are formed around the inner peripheries of the fingers 76 to engage the upper end of the fish 12 when the fingers are pressed inwardly toward one another as will be described. It will be understood by those skilled in the art, however, that the fingers 76 may be separate elements and that the upper end 68 of the slips mechanism may be in the form of a ring supporting the separate fingers.

As illustrated in the drawings, the upper end 68 of the slips mechanism 70 is extended inwardly and provided with a bore 80 therethrough of a size to slidingly receive the slips control member 62. Thus, the upper end 68 of the slips mechanism 70 will contact the stop flange 66 on the lower end of the slip control member 62 when the slips mechanism is in the lower position, as shown in Fig. 1, and may contact the nut 60 when the slips mechanism is moved upwardly around the slip control member 62 as illustrated in Fig. 2.

A tubular extension 82 is threadedly secured around the lower end 22 of the housing 14 and extends downwardly around the slips mechanism 70. The lower portion of the extension 82 is commonly known in the art as a slips bowl or actuator, and the lower portion 84 of the inner periphery thereof is tapered inwardly toward the lower end 86 of the member to actuate the slips mechanism 70. In other words, the expanded diameter of the slips mechanism 70 is such that the fingers 76 are engaged by the tapered portion 84 of the member 82 and the fingers are compressed inwardly toward one another when the slips mechanism 70 is in its lowermost position as illustrated in Fig. 1. Thus, the tapered area 84 contracts the fingers 76 into engagement with the upper end of the fish 12 to provide an effective coupling of the fishing tool 10 to the fish 12. Also, the lower end 86 of the member 82 is preferably tapered upwardly and inwardly to facilitate the downward movement of the tool 10 over the upper end of the fish 12 for engagement of the fish by the slips mechanism 70.

A helical compression spring 88 is positioned in the member 82 and extends between the lower head 20 and the upper end 68 of the slips mechanism 70. A suitable skirt or flange 90 is formed on the lower head 20 to maintain the spring 88 in alignment in the member 82 concentrically around and out of interference with the mandrel 48 or nut 60. The spring 88 constantly urges the slips mechanism 70 downwardly for engagement by the tapered area 84 of the member 82, as well as resisting any upward movement of the slips mechanism 70, as will be described.

Operation

When the tool 10 is being lowered through a well bore or the like by means of a device such as the wire line 26, the piston 28 will be held downwardly against the lower head 20 by action of the spring 36, and the slips mechanism 70 will be held downwardly into engagement with the tapered area 84 of the member 82 by means of the spring 88. Therefore, the fingers 76 of the slips mechanism 70 will be contracted, and the oil 56 in the chamber 30 will all be positioned above the piston 28.

As the lower end 86 of the housing extension 82 is moved over the upper end of the fish 12, the fish will contact the slip fingers 76 and move the slips mechanism 70 relatively upward in the member 82. As the downward movement of the fishing tool 10 is continued, the slips mechanism 70 will be moved upwardly around the slip control 62 until the fingers 76 are raised along the tapered area 84 a sufficient distance that the fingers 76 are expanded to receive the upper end of the fish 12 therebetween. As shown in Fig. 2, and as previously indicated, the slip fingers 76 will expand or move outwardly when they are moved out of engagement with the tapered area 84 to increase the effective inner diameter of the slips mechanism 70, such that the upper end of the fish 12 may be moved into the slips mechanism. The distance between the stop flange 66 and nut 60 is normally sufficient to allow upward movement of the slips mechanism 70 and expansion of the fingers 76 without raising the piston 28. However, the slips mechanism 70 and the piston 28 can be moved upwardly to the position shown in Fig. 2 when the fish 12 is being engaged, without damage to the apparatus.

When the upper end of the fish 12 is telescoped into the slips mechanism 70, the fishing tool 10 is raised by pulling upwardly on the wire line 26. During upward movement of the housing 14 and extension 82, the spring 88 will urge the slips mechanism 70 relatively downward with respect to the housing to bring the finger 76 into contact with the tapered area 84 and compress the serrations 78 of the fingers against the outer surface of the fish. It should be noted in this regard, however, that the initial upward movement of the fishing tool 10 should be relatively slow to assure that the slips mechanism 70 will be moved into contact with the tapered surface 84 before the member 82 is raised above the fish 12, since the rate of expansion of the spring 88 is controlled, as will be described more in detail below.

With the slips mechanism 70 engaged around the upper end of the fish 12, and with the fingers 76 in contact with the tapered area 84 as illustrated in Fig. 1, the fish 12 will normally be removed from the well bore by a continued upward pull on the wire line 26. However, in some situations, as previously indicated, the fish 12 will be stuck in the well bore and cannot be removed by a simple upward pull on the wire line 26. In this latter event it is desirable that the fishing tool 10 be released from the fish 12 for removal of the fishing tool from the well bore; such that the fish 12 can be loosened by other appropriate tools.

In order to release the fishing tool 10 from the fish 12, slack is provided in the wire line 26 to lower the member 82 downwardly around the fish. The weight of the fishing tool will therefore be imposed on the spring 88 to compress the spring 88 and move the slips mechanism 70 relatively upward in the housing extension 82. In this connection it may be noted that the slips mechanism 70 will move with respect to the slip control member 62 either until the upper end 68 of the slips mechanism contacts the nut 60, or until the upper end of the fish contacts the stop flange 66 as illustrated in Fig. 2. It will be apparent that when the upper end of the fish 12 contacts the stop flange 66 the piston 28 will be moved relatively upward through the chamber 30 and will force the body of oil 56 from the upper end of the chamber 30 through the restricted passageway 34 into the lower end of the chamber 30. The downward movement of the housing 14 and housing extension 82 is continued until the spring 36 is fully compressed as illustrated in Fig. 2. At this time at least the majority of the oil 56 will be in the lower end portion of the chamber 30 below the piston 28 and the slips mechanism 70 will be completely removed from the tapered area 84, such that the slip fingers 76 will not be in engagement with the fish 12. This latter position of the piston 28 and slips mechanism 70 will be clearly indicated to the operator of the device by the appearance of slack in the wire line 26.

With the fishing tool 10 in the position shown in Fig. 2, the wire line 26 is quickly raised to raise the fishing tool 10 from around the upper end of the fish 12. The downward movement of the slips mechanism 70, upon movement of the slip control member 62 above the upper end of the fish 12, will be relatively slow, since the oil 56 in the lower end of the chamber 30 must flow through the restricted passageway 34 into the upper end of the chamber 30. This controlled flow of the oil 56 resists the expansion of the springs 36 and 88, which in turn controls the downward speed of movement of the slips mechanism 70. It will be apparent that the restricted passageway 34 may be of a size to allow upward movement of the housing 10 at a rate faster than the downward movement of the slips mechanism 70, such that the entire fishing tool 10 may be raised above the fish 12 before the slips mechanism 70 can become re-engaged with the fish 12.

In some recovery or fishing operations, it is desirable to use the tool 10 for jarring a stuck fish prior to coupling the tool to the fish. To allow such an operation, this invention contemplates the use of a limiting device 100 (see Fig. 3) for further limiting the upward movement of the piston 28 and slips mechanism 70. The limiting device 100 comprises a cap 102 threaded into a counterbore 104 formed in the piston 28 at the lower end of the aperture 34. A sleeve 106 having a closed lower end is slidingly disposed in the cap 102 and is held against the upper end of the counterbore 104 by a spring 108. When the sleeve 106 is in the position shown in Fig. 3, a port 110 in the wall of the cap 106 mates with a groove 112 formed around the sleeve 106. The groove 112 in turn communicates with a port 114 formed through the wall of the sleeve 106. Therefore, liquid can flow downwardly through the aperture 34, sleeve 106 and ports 114 and 110 into the lower end of the chamber 30. However, if a sudden pressure is created in the liquid above the piston 28, as by a jarring action in an upward direction on the piston 28, the sleeve 106 will be forced down against the spring 108 and discontinue communication between the ports 110 and 114. In this event, the piston 28 remains in the lower portion of the chamber 30 and the slips mechanism 70 remains in position for engaging the stuck fish when the tool is moved upwardly.

When using the device 100, the aperture 34 may be made larger and a separate orifice member 116 threaded into the aperture 34 as illustrated in Fig. 3. It will also be apparent that when the limiting device 100 is used, a stop (not shown) should be provided on the upper end of the head 20 to limit the downward movement of the piston 28 and prevent damage of the device 100 when the piston 28 is moved downwardly in the chamber 30.

From the foregoing it will be apparent that the present invention provides a novel fishing tool wherein the tool may be easily engaged with a fish and then easily disengaged from the fish by simple upward and downward movements of the fishing tool at controlled speeds. It should also be apparent that the fishing tool may be released from a stuck fish and re-engaged with the fish without the necessity of completely removing the fishing tool from the well bore, in the event the operator decides to attempt a removal of the fish a second time. Release of the fishing tool from a stuck fish requires no fluid conduits extending downwardly through the well bore and requires no weights to be dropped through the well bore for shearing pins and the like. It will be further apparent that the present fishing tool may be easily run in a well bore on a wire line for a fast and efficient fishing operation and yet the fishing tool may be easily disengaged from a stuck fish.

Changes may be made in the combination and arrangement of parts or elements as heretofore set forth in the specification and shown in the drawings, it being understood that changes may be made in the precise embodiment disclosed without departing from the spirit and scope of the invention as defined in the following claims. For example, the slips mechanism and slips actuator may be easily designed to engage the slips mechanism with the inner periphery of a tubular fish.

I claim:

1. A fishing tool for recovering a pipe or the like stuck in a well bore, comprising a housing, means for lowering and raising the housing through the well bore, spring-loaded slip means for coupling the housing to the stuck pipe, said slip means being slidingly carried by the housing in a position to contact the stuck pipe and be moved upwardly relative to the housing upon downward movement of the housing in the well bore adjacent the stuck pipe, said slip means also being biased in a direction to be disengaged from the stuck pipe, a slips actuator carried by the housing for moving the slip means into engagement with the stuck pipe upon downward movement of the slip means relative to the housing, a spring carried by the housing urging the slip means down relative to the housing, and snubbing means carried by the housing for controlling the rate of expansion of said spring, whereby the slip means may be released from the stuck pipe by first raising the slip means relative to the housing against the action of said spring and then raising the housing.

2. A fishing tool as defined in claim 1 wherein said snubbing means includes means forming a chamber in said housing, a piston reciprocally disposed in said chamber and connected to said slip means, and means for controlling the speed of movement of said piston in said chamber through at least a portion of the downward movement of said piston.

3. A fishing tool as defined in claim 2 wherein said means for controlling the speed of said piston includes a body of liquid in said chamber, and means for transferring said liquid between opposite ends of said chamber at a controlled rate.

4. A fishing tool as defined in claim 3 wherein said means for transferring said liquid between opposite ends of said chamber comprises a restricted passageway through said piston.

5. A fishing tool as defined in claim 3 wherein said liquid is oil.

6. A fishing tool for recovering a fish in the form of a pipe or the like stuck in a well bore, comprising a tubular housing, means for lowering and raising the housing through the well bore, a piston reciprocally disposed in the housing for vertical movement in the housing, a spring carried by the housing urging the piston downwardly, means for controlling the downward speed of the piston, a slips actuating mechanism, a slips mechanism adapted to engage the fish when at the same level as the slips actuating mechanism and disengage from the fish when at a different level than the slips actuating mechanism, one of said mechanisms being carried by the housing and movable simultaneously with the housing, the other of said mechanisms being carried by the piston and shaped to contact the fish in a predetermined position of the housing relative to the fish for raising the piston relative to the housing upon downward movement of the housing from said predetermined position, whereby the slips mechanism may be engaged with and then disengaged from the fish by lowering and raising the housing at controlled speeds.

7. A fishing tool as defined in claim 6 wherein said housing is shaped to form a chamber slidingly receiving the piston, said means for controlling the downward speed of the piston comprises a body of liquid in said chamber, and means for controlling transfer of the liquid between the opposite ends of said chamber at a predetermined rate.

8. A fishing tool as defined in claim 7 wherein said last-mentioned means comprises a restricted passageway formed through the piston.

9. A fishing tool for recovering a fish in the form of a pipe or the like stuck in a well bore, comprising a tubular housing having an upper end and a lower end, means for lowering and raising the housing through the well bore, vertically spaced heads in the housing forming a chamber therebetween, a piston reciprocally disposed in said chamber, mandrels extending from the upper and lower end faces of said piston through bores in said heads, means slidingly sealing each mandrel in its respective head, a body of liquid in said chamber, a restricted passageway through said piston for transferring the liquid between opposite ends of said chamber and controlling the speed of movement of said piston, a slips mechanism carried on the lower end of the lower mandrel for encircling the fish and coupling the housing to the fish, a tubular slips actuator carried on the lower end of the housing for contracting the slips mechanism in the lowermost position of the slips mechanism, and a spring carried by the housing for urging the slips mechanism down against the slips actuator.

10. A fishing tool as defined in claim 9 wherein said piston and mandrels are tubular in form to provide a continuous fluid passageway therethrough.

11. A fishing tool as defined in claim 9 characterized further to include a slip control secured on the lower end of said lower mandrel and having an outwardly extending stop on the lower end thereof, another outwardly extending stop on said lower mandrel in vertically spaced relation from the first-mentioned stop, said slips mechanism being slidingly telescoped around said slip control between said stops, said spring being anchored against the slips mechanism to urge the slips mechanism against the lower stop, and a second spring in said chamber urging said piston in a downward direction.

12. A fishing tool as defined in claim 9 wherein said restricted passageway has an upper end and a lower end and a counterbore in the lower end thereof, and characterized further to include a cap secured in said counterbore, a sleeve slidingly disposed in said cap, and a spring in said cap urging said sleeve against the end of said counterbore, said sleeve and cap having mating ports in the walls thereof when the sleeve is against the end of said counterbore, and said sleeve having a closed lower end for causing downward movement of said sleeve upon sudden pressures in liquid standing in said passageway.

No references cited.